(12) United States Patent
Wang et al.

(10) Patent No.: US 6,950,253 B2
(45) Date of Patent: Sep. 27, 2005

(54) CONTACT MAGNETIC PRINTING OF MAGNETIC MEDIA USING ACTUATED MAGNET POLES AND STAMPERS

(75) Inventors: Li-Ping Wang, Fremont, CA (US); Andrew George Prax, Antioch, CA (US); David Shaio-Min Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 260 days.

(21) Appl. No.: 10/262,300

(22) Filed: Sep. 30, 2002

(65) Prior Publication Data

US 2003/0133211 A1 Jul. 17, 2003

Related U.S. Application Data

(60) Provisional application No. 60/350,181, filed on Jan. 15, 2002.

(51) Int. Cl.[7] ................................................ G11B 5/86
(52) U.S. Cl. ....................................................... 360/17
(58) Field of Search ............................. 360/17, 16, 15, 360/75, 55

(56) References Cited

U.S. PATENT DOCUMENTS

| | | | |
|---|---|---|---|
| 5,075,801 A | * 12/1991 | Chi et al. | 360/17 |
| 5,991,104 A | 11/1999 | Bonyhard | |
| 6,347,016 B1 | * 2/2002 | Ishida et al. | 360/17 |

* cited by examiner

Primary Examiner—Alan T. Faber

(57) ABSTRACT

A magnetic printing apparatus includes a dipole magnet that supplies a magnetic field to a magnetic media, a holder for holding the magnetic media, a set of stampers with servo patterns and a press for pressing the magnetic media firmly against the stampers while the magnetic media and stampers are being exposed to a magnetic field and a set of elastomer pads to distribute and equalize the force of the press on the magnetic media. Servo formatting, using the contact magnetic printing apparatus, is done by positioning the magnetic media against the stampers. A force is then applied to the magnetic media and stamper so that the two are in firm contact with each other. A sequence of magnetic fields is then applied to the stampers and magnetic media which duplicates the servo patterns of the stamper onto the magnetic media.

21 Claims, 9 Drawing Sheets

CONTACT MAGNETIC PRINTING OF MAGNETIC MEDIA USING ACTUATED MAGNET POLES AND STAMPERS

This application claims priority from U.S. provisional application ser. No. 60/350,181, filed on Jan. 15, 2002.

BACKGROUND OF THE INVENTION

1. Field of the Invention

The present invention relates generally to the field of disc drive storage, and more particularly to contact magnetic printing used to create magnetic patterns on magnetic recording media.

2. Description of the Related Art

Conventional disc drives use magnetic properties of materials to store and retrieve data. Typically, disc drives are incorporated into electronic equipment, such as computer systems and home entertainment equipment, to store large amounts of data in a form that can be quickly and reliably retrieved. The major components of a disc drive include magnetic media in the form of a disk, read-write heads, a motor and software. The magnetic media is rotated by a motor at a constant high speed while the read-write head, which rests on a head gimble assembly, glides over the magnetic media reading and writing signals to the media. The surface of each magnetic media is divided into a series of data tracks, which are radially spaced apart and which extend circumferentially around the magnetic media disc. The data tracks store data in the form of magnetic flux transitions within the radial extent of the tracks on the disc surfaces.

Typically, each data track is divided into a number of data sectors that store fixed sized blocks of user data. Embedded among the sectors on each track are servo fields that enable the disc drive to control the position of heads used to transfer the user data between the discs and a host computer. More particularly, the heads are mounted to a rotary actuator assembly which includes a coil of a voice coil motor, so that the position of the heads relative to the tracks can be maintained by the application of current to the coil by a closed loop digital servo system in response to the servo information read by the servo fields.

The servo fields are written to the discs during the manufacture of the disc drives using an extremely precise servo track writer as illustrated in FIG. 1A. Conventional servo track writers include an anti-vibration table 110, a recording media 115, a spindle motor with a hub 120, which rotates the media in a direction 125, a read-write head 130, an arm 135 and a controller 140. Anti-vibration table 110 is a conventional table designed to reduce vibration. Spindle motor with hub 120 rotates recording media 115 at a constant rate while read-write head 130 reads and writes servo signals to recording media 115. Read-write head 130 is attached to an arm 135 which driven by controller 140. Controller 140 contains a laser based positioning system which moves arm 135 by receiving feedback from a closed loop detection system and engaging an actuator assembly that advances the position of the read-write head to the servo writing position. Additionally, controller 140 includes control circuitry for providing servo information to be stored in the servo fields. Since servo fields are used to define tracks, precise control and positioning of the read-write head is required during the servo field writing to the recording media 115 surface.

The typical manufacturing process of magnetic disk with a servo pattern in illustrated in FIG. 1B. In a first step 150, a disk is prepared for sputtering by being textured and cleaned. Next in step 155, various layers including a magnetic layer and a protective layer are deposited on top of the disk. The magnetic layer usually consists of a cobalt based alloy and is used to record information via magnetic signals whereas the protective layer usually consists of a diamond like carbon layer. Next in step 160, a lube layer is deposited over the media with the magnetic layer. In step 165, the lubed disked undergoes a buff process wherein the media is smoothed by rubbing a pad over the top of the surface. After being buffed, the media is glide tested in step 170 for defects that could cause a head to crash thereon. Next in step 175, the media is certified by writing signals to it and reading signals from it. Typically, after certification is done in step 175 the media is shipped to a hard drive building facility where it is servo formatted and installed into a hard drive. The servo formatting is then done in step 180 with a conventional servo writer as was discussed with reference to FIG. 1A above. Finally, in step 185 the disk is tested again and installed into a finished hard drive.

In order to facilitate reliable operation of the disc drive, proper radial alignment of the servo fields is essential. If errors are introduced in the placement of the servo fields, position error signals (PES) generated by the servo system during subsequent operation of the drive are detected at corresponding frequencies. The PES is a measure of the relative position of a selected head with respect to an associated track and is used primarily during track following operations to maintain the head over the center of the track. Frequency dependent PES for a given track result in the repeated adjustment of the position of the head by the servo system in an attempt to maintain the head over the center of the track during each revolution of the disc. When such frequencies are sufficiently severe, the correction required to account for these frequencies can require a significant amount of correction limiting the overall track density that can be achieved in a disc drive design. One source of error that occurs during the servo writer process is the spindle motor, which includes bearing assemblies with characteristic frequencies that are generated from the rotation of the balls and ball cages within the inner and outer bearing raceways. These bearing frequencies can result in low frequency errors being laid down in the servo pattern.

Accordingly, there is a need for an improved servo writer system and method that permits the writing of servo patterns early on in the process while reducing the number of servo data errors written to discs of a disc drive.

SUMMARY OF THE INVENTION

This limitation is overcome by using a contact magnetic printing system and apparatus for servo formatting magnetic media used in hard drives.

A system for contact magnetic printing servo patterns onto a magnetic media that does not involve the use of conventional servo writers is disclosed. The apparatus includes a dipole magnet that supplies a magnetic field to a magnetic media, a holder for holding the magnetic media, two stampers with servo patterns and a press for pressing the stampers firmly against the magnetic media while the magnetic media and stampers are exposed to a magnetic field. An elastomer pad is also used to deliver and spread evenly the force of the press on the magnetic media/stamper stack. In the case of single sided printing one stamper can be used instead of two.

Additionally, a method for contact magnetic printing servo patterns onto a magnetic media that does not involve the use of conventional servo writers is disclosed. The magnetic media to be servo patterned is first positioned against two stampers so that each stamper is abutted against opposite sides of the magnetic media. In the case of single sided printing only one stamper is used and that stamper is abutted against the one side of the magnetic media that is to be servo written. The magnetic media/stampers stack is then loaded and aligned in a system for contact magnetic printing, applying a force on the magnetic media/stampers stack so that they are in firm contact with each other at the interface. A sequence of magnetic fields, of sufficient strength, is then applied for a set time to the magnetic media/stampers stack while it is subjected to the force. An example of a typical sequence of magnetic fields includes applying a first magnetic field of approximately 15 KOe in one direction for a few milliseconds and then applying a second field of approximately 3 KOe is the opposite direction for a few milliseconds. Finally, the magnetic field is removed, the magnetic media/stampers stack is unloaded from the contact magnetic printing apparatus and the stampers and magnetic media are separated.

BRIEF DESCRIPTION OF THE INVENTION

DETAILED DESCRIPTION OF THE PREFERRED EMBODIMENTS

The invention provides a system and method for creating magnetic patterns on magnetic recording media. In particular, the invention provides a system and method for servo formatting magnetic media using contact magnetic printing.

Figure 1A:
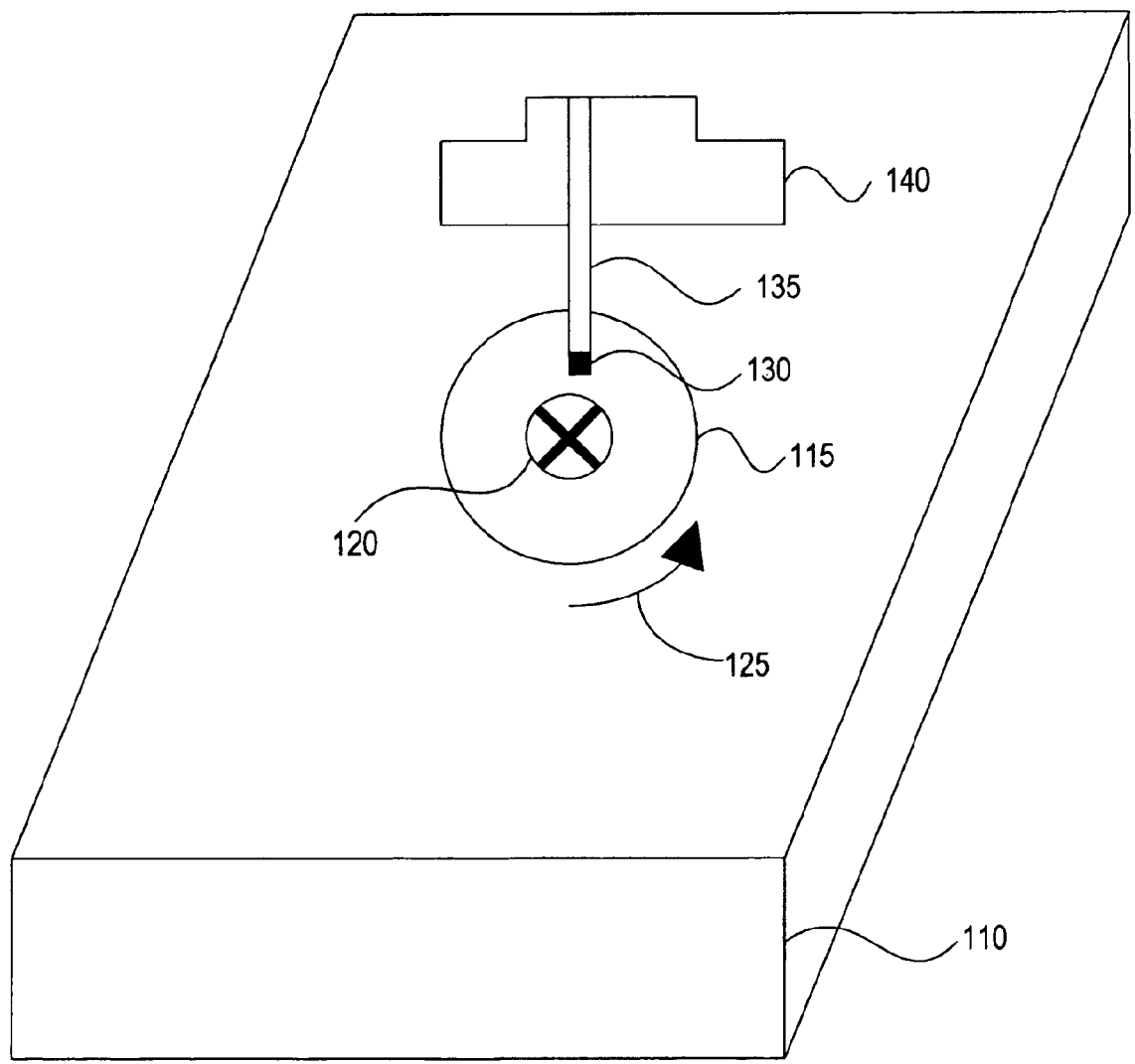
FIG. 1A is a block diagram showing the writing of servo patterns using conventional servo writers.
Figure 1B:
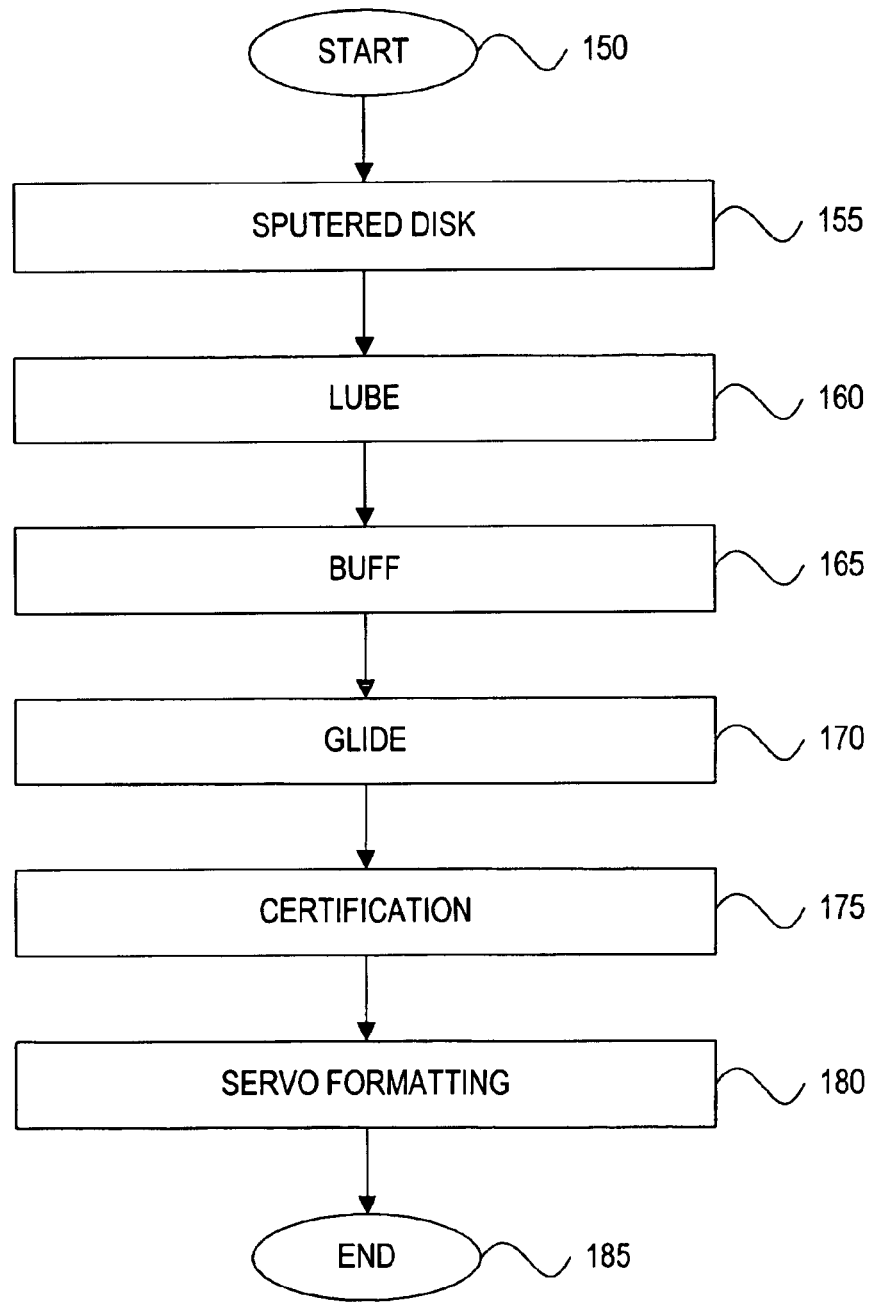
FIG. 1B is a flowchart illustrating the prior art method of printing servo patterns.
Figure 2:
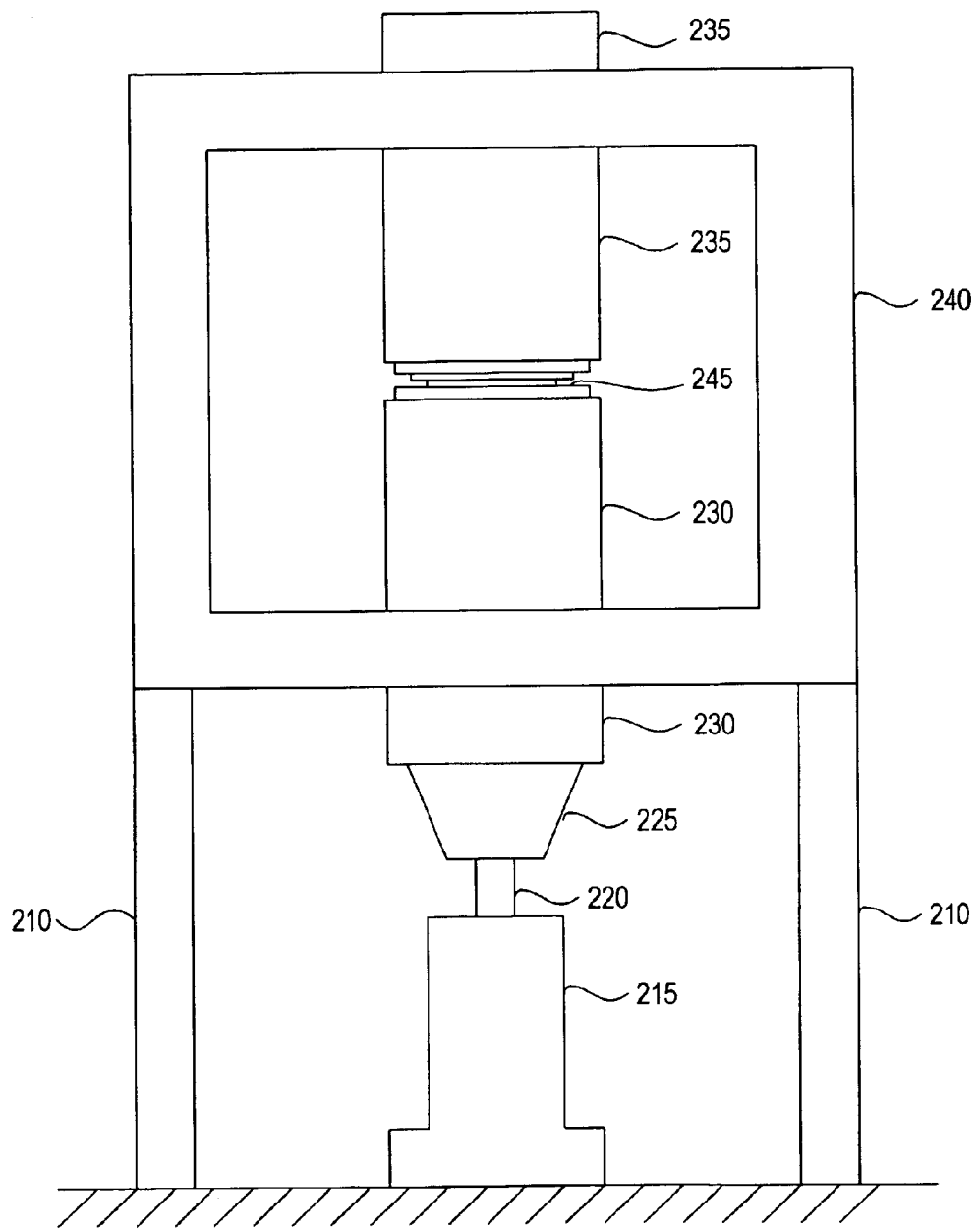
FIG. 2 is a block diagram showing a contact magnetic printer using actuated magnet poles for contact pressure source in accordance with an embodiment of the invention.

FIG. 2 represents a contact magnetic printer, in accordance with one embodiment of the invention, including a frame 210, a press 215, a driving rod 220, a stage 225, a first magnetic pole 230, a second magnetic pole 235, a yoke 240 and a sample holder 245.

Frame 210 is a support structure typically made of sturdy materials such as iron, aluminum or stainless steel. The main function of frame 210 is to hold up the contact magnetic printer and its components. Additionally, frame 210 can include an antivibration mechanism, such as an air bearing surface, for decoupling the contact magnetic printer from the floor.

Press 215 is a hydraulic press used to apply force to the sample in a uniaxial direction. Press 215 typically consists of a hydraulic press, with a pressure gauge, that is capable of applying forces of up to hundreds of tons and measuring those forces through the pressure gauge. Alternatively, other forms of presses, such as screw presses, can be used to achieve the same goals. It will be recognized by those skilled in the art that a variety of presses are available to supply force to samples which are adaptable to the constraints of the particular environment or the pressures needed for the contact magnetic printing. Driving rod 220 is typically made of a strong material such as stainless steel and is used to transfer the force supplied by press to 210 to stage 225, which supports the first magnetic pole 230.

First magnetic pole 230 and second magnetic pole 235 are typically electromagnets that each include windings of electrical conductors and a core. The electrical conductors can be closely wound copper tubing, which allow for water cooling when operating at high electrical currents, as is well known by those skilled in the art. The core can be constructed from a material having high magnetic permeability, high saturation magnetization, low remanence and low coercivity. Similarly yoke 240 is constructed from of a material having high magnetic permeability, high saturation magnetization, low remanence and low coercivity. Both the yoke 240 and the core of electromagnets 230 and 235 can be made of materials such as permalloy or mu-metal. The faces of both first magnetic pole 230 and second magnetic pole 235 are typically flat within 25 microns over 100 milimeters in diameter area, and are parallel with each other to within 50 microns. These dimensional requirements are useful for providing uniform pressure as well as for achieving magnetic field uniformity.

In one embodiment, press 215 is used to control the vertical position of the first magnetic pole 230, which is supported by the driving rod 220 and stage 225. In this embodiment the second magnetic pole 235 is generally fixed to the yoke 240 of the magnet. By pushing the first magnetic pole 230 in the direction of the fixed second magnetic pole 235 with press 215 a uniaxial force is created on the sample holder 245. In an alternative embodiment the vertical position of both the first magnetic pole 230 and the second magnetic pole 234 can be adjusted. In this alternative embodiment one pole can be used for applying high forces whereas the second pole can be used for applying low forces. In another embodiment, the first magnetic pole 230 can have a first pole section and a second pole section wherein the first pole section is fixed but the second pole section is adjustable and can be adjusted to apply a force to the sample holder 245. In another embodiment the press 215 can be positioned between the first magnetic pole 230 and the second magnetic pole 235 such that the press 215 supplies the force directly to the sample holder 245.

The combination of the first magnetic pole 230, second magnetic pole 235 and yoke 240 form the dipole magnet while the combination of press 215, driving rod 220 and stage 225 form the pressing assembly. The apparatus for contact magnetic printing is the combination of the dipole magnet and the pressing assembly. The dipole magnet is used to apply a uniform magnetic field between the pole faces and the pressing assembly is used to supply a force on the sample holder 245.

In an alternative embodiment, the first magnetic pole 230 and the second magnetic pole 235 can be permanent magnets. Permanent magnets can include magnetic materials such as Neodymium-Iron-Boron (NdFeB) or Samarium-Cobalt (SmCo). It will be recognized by those skilled in the art that these and other magnet designs have both advantages and disadvantages depending on the application.

Sample holder 245 is designed to hold conventional magnetic media, which resemble thin circular disks with a circular hole punched out in the center, as discussed in detail with reference to FIG. 3 below. Typical dimensions of magnetic media can be thickness of approximately 3 mm, a circular outside diameter of approximately 90 mm diameter and circular inside diameter of approximately 25 mm.

Figure 3:
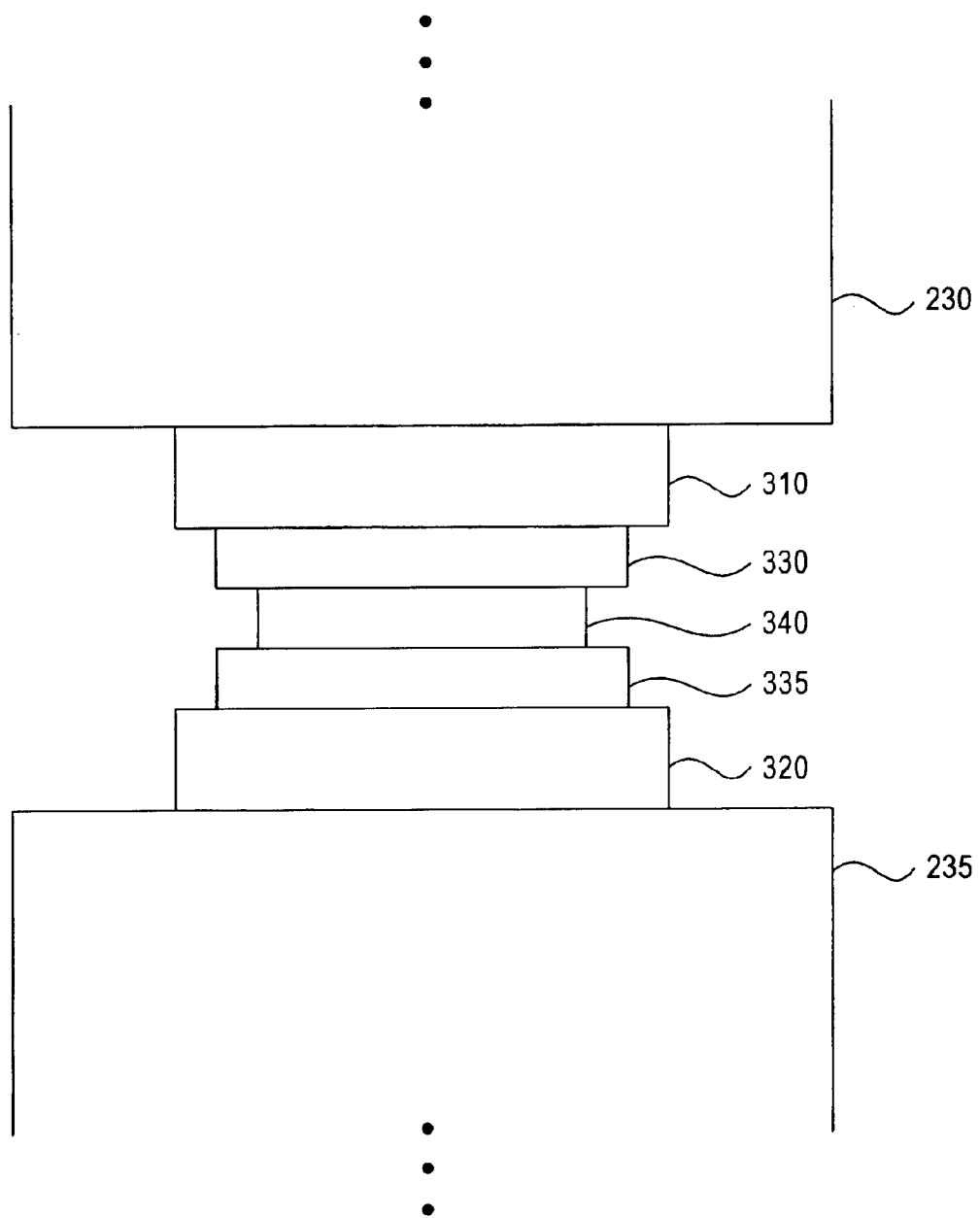
FIG. 3 is a block diagram showing the detailed configuration of the sample holder 245.

FIG. 3 is a block diagram showing the detailed configuration of the sample holder 245 including the first magnetic pole 230, a second magnetic pole 235, a first elastomer pad 310, a second elastomer pad 320, a first stamper 330, a second stamper 335 and a magnetic media 340. First elastomer pad 310 and second elastomer pad 320 are made of an elastic material, such as silicon rubber, which conforms to the geometry of an object which it is pressed against. First stamper 330 and second stamper 335 contain data patterns thereon, as discussed in detail with reference to FIG. 4 below, which are transferred to the magnetic media 340. Although the data patterns on first stamper 330 and second stamper 335 can be the same, they do not have to contain the same data patterns. In fact, since different sides of the magnetic media 340 typically require different servo patterns, first stamper 330 and second stamper 335 usually have different servo patterns. Additionally, first stamper 330 and second stamper 335 are made out of some magnetic material such as nickel, iron or cobalt and is used to direct the magnetic field as described in detail with reference to FIGS. 5 and 6 below.

When a force is applied to the magnetic media 340, using the press 215, the first elastomer pad 310 and second elastomer pad 320 are compressed and deform according to the surface profiles of first stamper 330 and second stamper 335. As a result, uniform force is achieved at the sample holder 245 allowing for simultaneous uniform force and magnetic field at the contact.

Figure 4A:
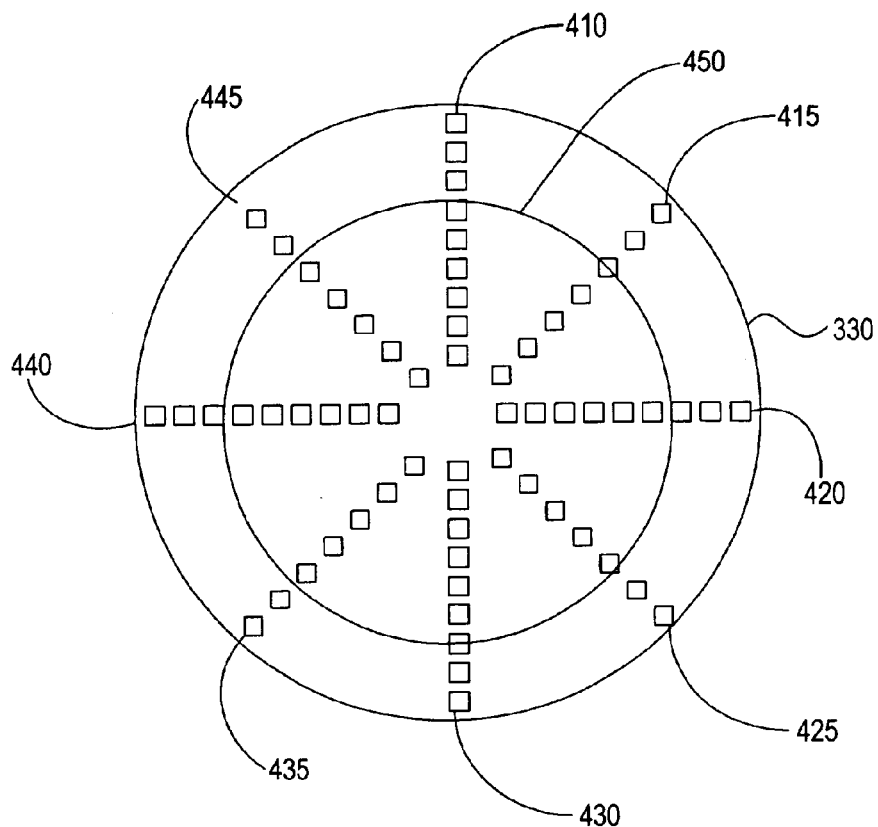
FIG. 4A is a top view of stamper 330.

FIG. 4A is a top view of stamper 330 including patterns 410, 415, 420, 425, 430, 435, 440, 445 and track 450. Stamper 330 is typically made out of a soft magnetic material such as Nickel. The patterns are typically punched into the material so that a magnetic field exiting the stamper mimics the pattern on the stamper near the surface of the stamper and as is further discussed with reference to FIG. 5 below. Patterns 410, 415, 420, 425, 430, 435, 440 and 445 are typically binary codes which translate into commands that align the head to the drive and give information about track width and location. An example of a typical binary code that is found in patterns 410, 415, 420, 425, 430, 435, 440 and 445 is discussed in detailed with reference to FIG. 4B, below. Track 450 is a collection of data located at a fixed radius from the center of magnetic media 340, from which the head reads and writes to during one revolution of magnetic media 340.

Figure 4B:
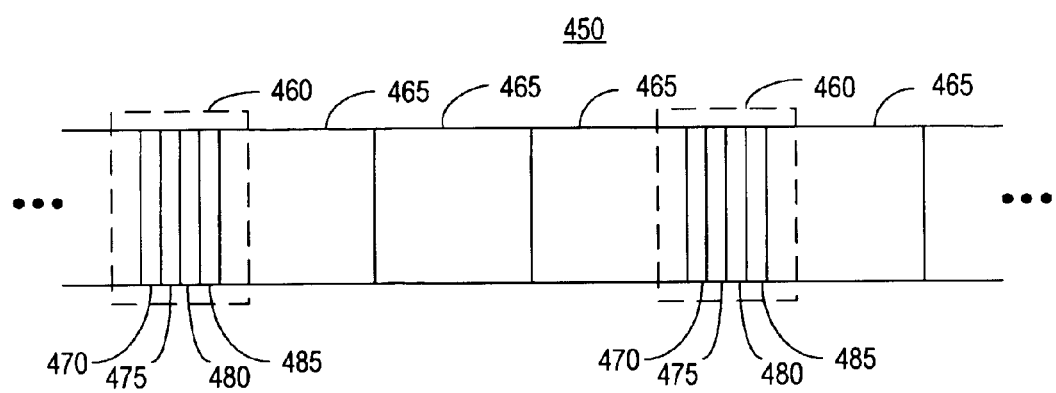
FIG. 4B shows details of a portion of a track 450.

FIG. 4B shows a portion of a track 450 at a selected radius on the magnetic media 340 between any two adjacent patterns, such as pattern 410 and 415, illustrating the arrangement of respective servo fields 460 from patterns 410–445 and user data fields 465. Each pattern 410–445 contains one servo field 460 for each track 450 wherein each servo field 460 preferably includes an automatic gain control field 470, an index field 475, a gray code field 480 and a position field 485. The automatic gain control field 470 provides an oscillating signal that prepares the servo circuitry within a hard drive for remaining portions of the servo field 154, the index field 475 provides an angular reference for the servo circuitry within a hard drive, the gray code field 480 provides a unique track address to indicate radial position for the track 450, and the position field 485 provides an arrangement of servo patterns that allows the servo circuitry within a hard drive to perform intra-track positioning. It will be apparent to those skilled in the art that other servo field configurations can be readily employed, including different arrangements of servo fields as well as a dedicated servo scheme wherein one disc surface is used to store servo data and the remaining discs are used to store user data.

Figure 5:
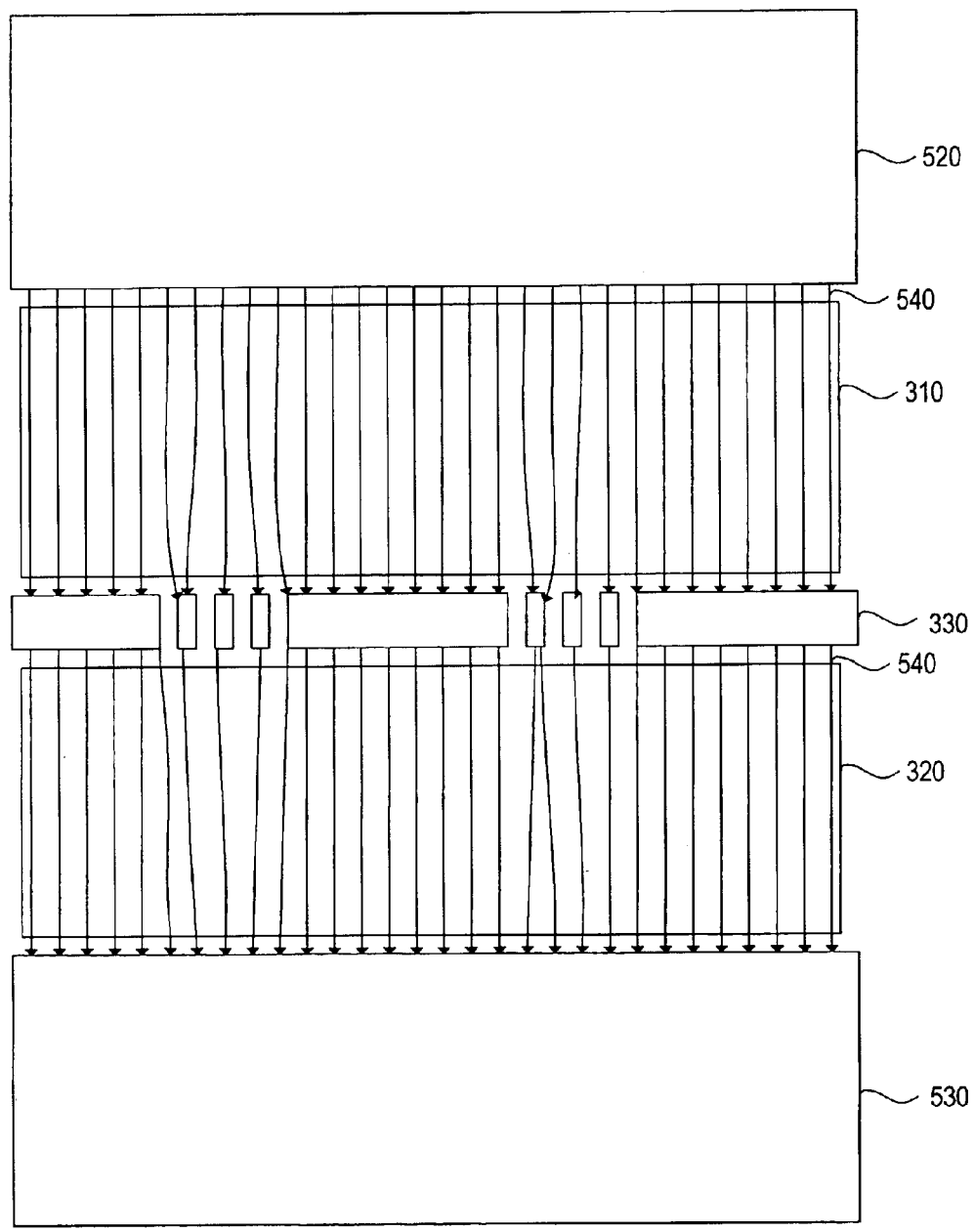
FIG. 5 shows the stamper in the presence of a magnetic field.

FIG. 5 shows the stamper 330 in the presence of a magnetic field including first elastomer pad 310, second elastomer pad 320, first stamper 330, a magnetic north pole 520, a magnetic south pole 530 and magnetic field lines 540, in accordance with one embodiment of the invention. Magnetic north pole 520 and magnetic south pole 530 are both typically iron cores surrounded by windings of copper wire. The magnetic field lines 540 point from the magnetic north pole 520 to the magnetic south pole 530 and are perpendicular to both the magnetic north pole 520 surface and the magnetic south pole 530 surface. Since first stamper 330 is made from magnetic materials and are each placed in between the magnetic field lines 540, the magnetic field lines enter and exit first stamper 330 at perpendicular angles to both the top and bottom surface of first stamper 330. The characteristics of the magnetic field lines 540, in accordance with the present invention, are governed by solutions to Maxwell's equation with appropriate boundary conditions as will be recognized by those skilled in the art. Since the magnetic field lines 540 are constrained to contact any magnetic surface at right angles, the magnetic field lines 540 curve in the space between magnetic surfaces so that they both satisfy Maxwell's equations at any point in the space and the boundary value condition that the magnetic field lines 540 be perpendicular to a magnetic surface. This curving of the magnetic field lines 540 occurs as soon as the magnetic field lines 540 leave the magnetic surface and therefore the profile of the magnetic field lines 540 is different at the surface of first stamper 330 than at a position far removed from the stamper. Therefore, in order to insure that the magnetic field lines 540 have the same pattern as first stamper 330, the magnetic media 340 is positioned as close as possible to the first stamper 330, as further discussed with reference to FIG. 6 below. Additionally, since the first elastomer pad 310 and the second elastomer pad 320 are made of a non-conductive and non-magnetic material the magnetic field lines 540 penetrate through both elastomers as if they were free space.

Figure 6:
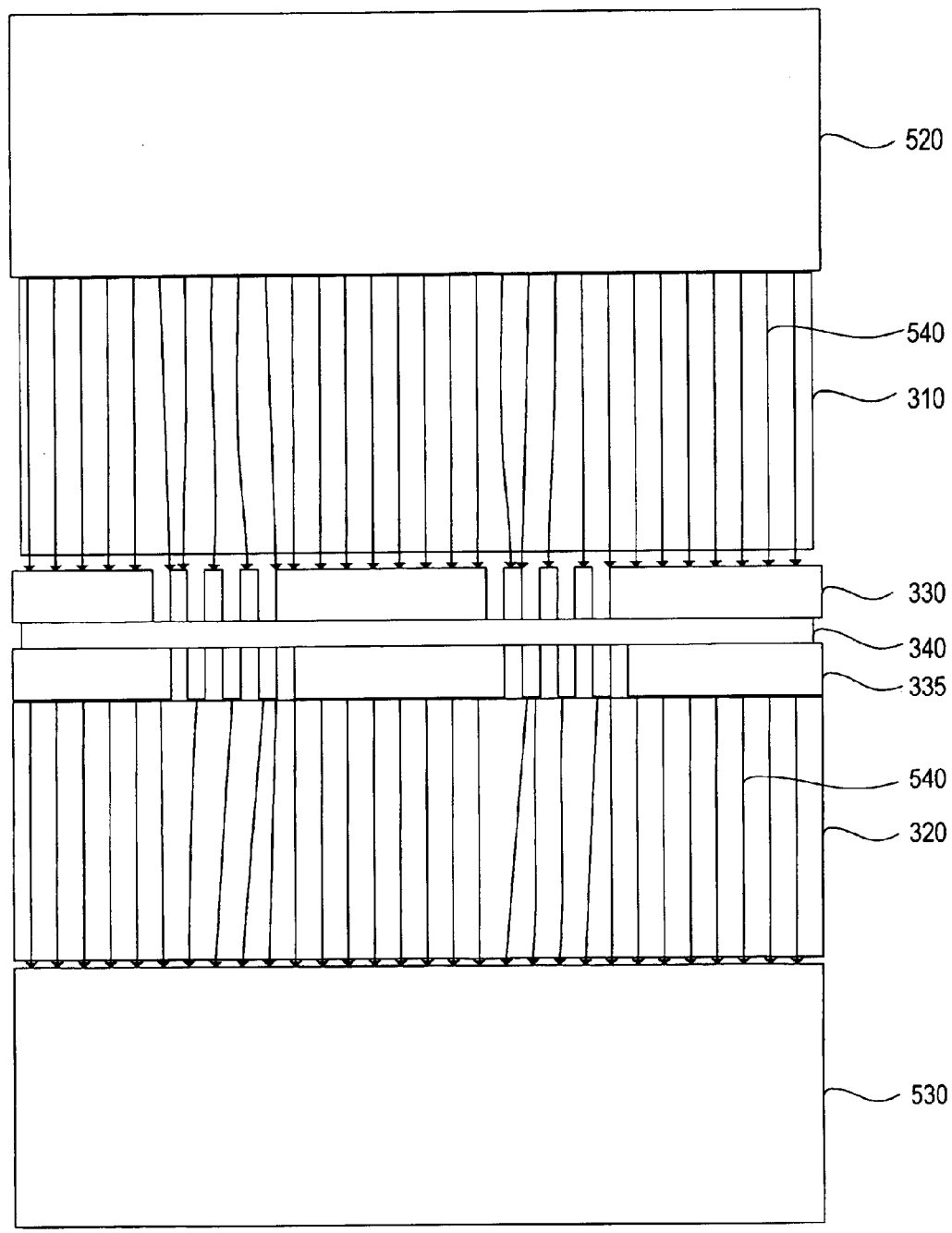
FIG. 6 shows the stamper 333 along with a conventional magnetic media in the presence of a magnetic field in accordance with one embodiment of the invention.

FIG. 6 shows the magnetic media 340 in the contact magnetic printing environment of FIG. 5 including first elastomer pad 310, second elastomer pad 320, first stamper 330, second stamper 334, a magnetic north pole 520, a magnetic south pole 530 and magnetic field lines 540 and the magnetic media 340, in accordance with one embodiment of the invention. Magnetic media 340 is positioned to make direct and firm contact with first stamper 330 and second stamper 335. Since one application of this embodiment is to duplicate the stamper patterns onto the magnetic media 340 through the use of the magnetic field lines 540 which curve in free space as was discussed with reference to FIG. 5 above, it is desirable to have the magnetic media 340 as close as possible to first stamper 330 and second stamper 335 to ensure that the magnetic field lines 540 have the same pattern as first stamper 330 and second stamper 335 at the respective surfaces of the magnetic media 340. Since the magnetic media 340 is positioned so that it abuts firmly against first stamper 330 and second stamper 335, the magnetic field line 540 do not have a chance to disperse before reaching magnetic media 340 and consequently the patterns on first stamper 330 and second stamper 335 are preserved within the magnetic field lines when they reach the magnetic media 340. Since the magnetic media 340 is magnetized by the magnetic field lines 540 and the magnetic field lines 540 have the same pattern as first stamper 330 and second stamper 335, the first stamper 330 pattern and second stamper pattern 335 are each transferred to opposite sides of the magnetic media in the form of a magnetic imprint. The strength of the magnetic field is chosen so that it is high enough to magnetize the magnetic media 340 and is typically about 4500 gauss. However, the magnitude of the required magnetic field is dependent on the materials used to construct the layer.

Figure 7:
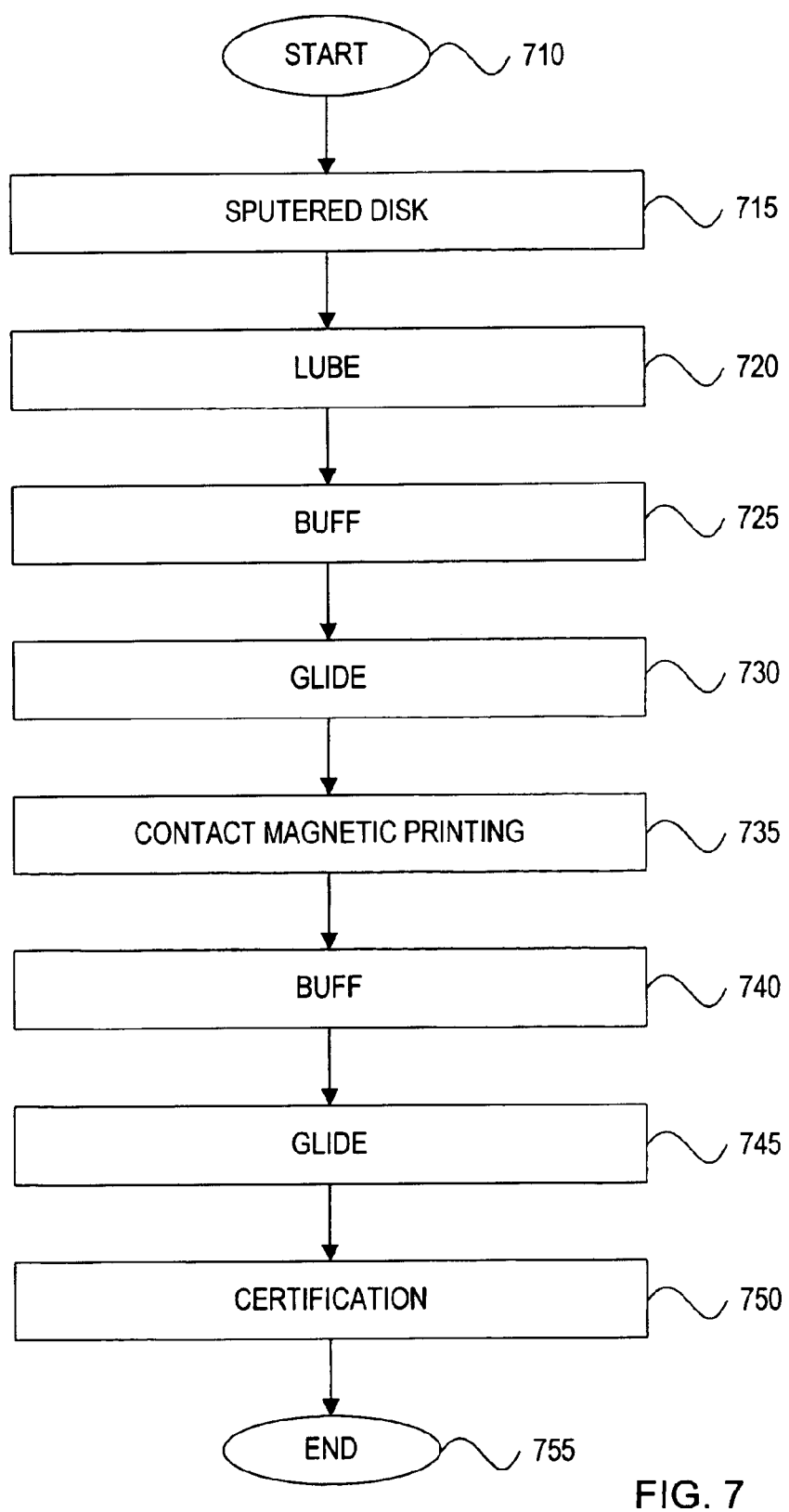
FIG. 7 is a flowchart showing the preferred method of making perpendicular contact print magnetic media in accordance with an embodiment of the invention.

FIG. 7 is a flowchart showing the preferred method for servo formatting magnetic media using contact magnetic printing, in accordance with an embodiment of the invention. In a first step 710, a disk is prepared for sputtering by being textured and cleaned. Next in step 715, various layers including a magnetic layer and a protective layer are deposited on top of the disk. The magnetic layer usually consists of a cobalt-based alloy and is used to record information via magnetic signals whereas the protective layer usually consists of a diamond like carbon layer. Next in step 720, a lube layer is deposited over the media with the magnetic layer. In step 725, the lubed disked undergoes a buff process wherein the media is smoothed by rubbing a pad over the top of the surface. After being buffed, the media is glide tested in step 730 for defects that could cause a head to crash thereon. Next in step 735, the magnetic media is servo formatted using contact magnetic printing (CMP) as further discussed with reference to FIG. 8 below. In step 740, the servo-formatted disk undergoes a second buff process wherein the media is smoothed by rubbing a pad over the top of the surface. After being buffed, the media is glide tested again in step 745 for defects that could cause a head to crash thereon. Next, in step 750, the magnetic media is certified by testing its read-write functionality. Finally in step 755, the certified magnetic media is installed in a hard drive.

Figure 8:
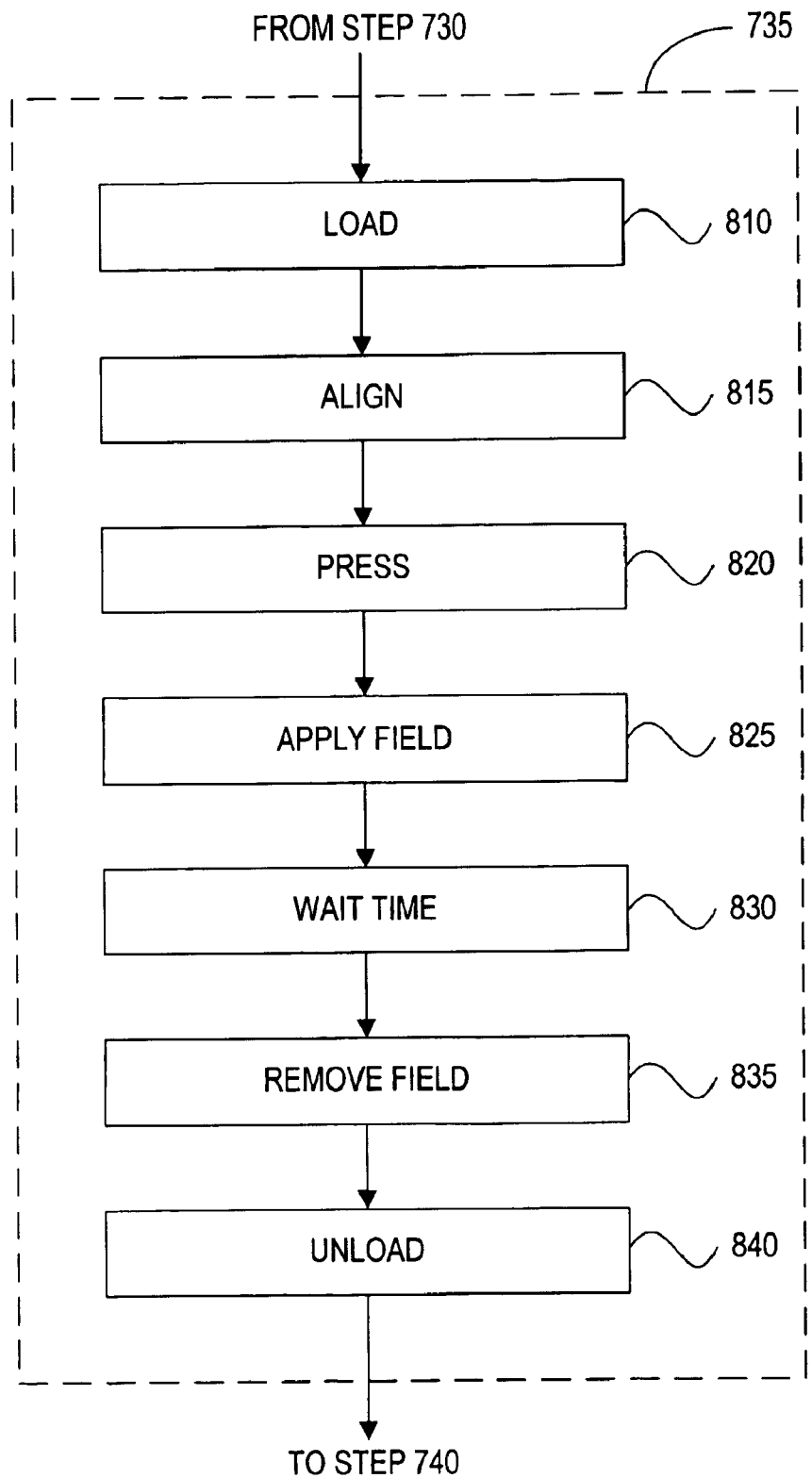
FIG. 8 shows further details of the CSPM step 750.

FIG. 8 shows further details of the CMP step 735. First in step 810, the magnetic media 340 is loaded into the contact magnetic printer by aligning the magnetic media 340 with first stamper 330 and second stamper 335 on the other side of magnetic media 340. The first stamper 330, magnetic media 340 and second stamper 335 are positioned in between first elastomer pad 310 and second elastomer pad 320 which is between the magnetic north pole 520 and the magnetic south pole 530. Next in step 815, the first stamper 330, magnetic media 340 and second stamper 335 are aligned within the center of the magnetic poles. Next in step 820, a force is applied to the first stamper 330, magnetic media 340 and second stamper 335 forcing all three to make firm contact with each other, such firm contact to minimize magnetic field divergence at the surface of the magnetic layer of the magnetic media when the magnetic field is applied. The force is applied with press 215 indirectly through a first elastomer pad 310 and a second elastomer pad 320. Next in step 825 a sequence of magnetic fields are applied between magnetic north pole 520 and magnetic south pole 530 by running current through the windings in the poles. An example of a typical sequence of magnetic fields includes applying a first magnetic field of approximately 15 KOe in one direction for a few milliseconds and then applying a second field of approximately 3 KOe is the opposite direction for a few milliseconds. The first magnetic field of 15 KOe is typically called the DC erase field and is used to prepare that magnetic media 340 for servo formatting. The second magnetic field of 3 KOe is applied in the opposite direction to the DC erase field and is used to servo pattern the magnetic media 340. Although the magnetic field strengths are chosen to be 15 KOe and 3 KOe respectively, the only magnetic field requirements are that the magnetic fields be sufficiently uniform and strong to servo format the magnetic media 340. Typically the uniformity of the magnetic field is less than 0.5 percent. After the magnetic field is turned ON in either the DC erase or servo writing cases, the magnetic media 340 remains in the field for a waiting time of greater than a few fractions of a second in step 830. If a pulsed magnet is used the magnetic media 340 may only remain in the field for a few milliseconds. Next in step 835 the magnetic field is removed. Finally in step 840 the first stamper 330, magnetic media 340 and second stamper 335 is unloaded and the magnetic media 340 is moved onto the next step of the process.

In an alternative embodiment the DC erase magnetic field and servo writing field can be applied in different magnetic presses. The first magnetic press can be built to go to higher fields whereas the second press can be built to apply a smaller field. One advantage of having a dual set of magnetic presses is that need to have polarity reversal capabilities is eliminated. Additionally, it may be advantages for factory throughput to have a dual set of magnetic presses.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A system for creating a magnetic pattern on a magnetic media, comprising:
    a stamper containing a pattern;
    a press for applying a force to said magnetic media and said stamper; and
    a magnet capable of providing a magnetic field of at least 2000 Gauss to said stamper and said magnetic media.

2. A system for creating magnetic patterns on magnetic media, comprising:
    a stamper having a pattern;
    a press for supplying a force to said stamper and said magnetic media; and
    a magnet capable of providing a magnetic field of at least 2000 Gauss to said stamper and said magnetic media causing said pattern on said stamper to be transferred to said magnetic media.

3. The system of claim 2 wherein said magnet is an electromagnet.

4. The system of claim 2 wherein said magnet is a permanent magnet.

5. The system of claim 2 wherein said press is a pneumatic hydraulic press.

6. The system of claim 2 wherein said press is a screw press.

7. The system of claim 2 further including a sample holder for supporting said stamper and said magnetic media in a fixed position.

8. The system of claim 2 further including an elastomer pad for distributing and equalizing the force exerted by the said press.

9. The system of claim 2 wherein said force is sufficient to substantially minimize the divergence of said magnetic field at a surface of said magnetic media.

10. A system for creating magnetic patterns on magnetic media, comprising:
- a stamper with a pattern;
- a magnet having an adjustable first magnetic pole and second magnetic pole capable of supplying a magnetic field of at least 2000 Gauss to said stamper and said magnetic media; and
- a press for supplying a force to said adjustable first magnetic pole which transfers said force to said stamper and said magnetic media while said stamper and magnetic media are exposed to said magnetic field.

11. The system of claim 10 wherein said magnet is a electromagnet.

12. The system of claim 10 wherein said press is a hydraulic press.

13. A system for creating magnetic patterns on magnetic media, comprising:
- a stamper with a pattern;
- a magnet having an adjustable first magnetic pole and second magnetic pole for supplying a magnetic field to said stamper and said magnetic media;
- a press for supplying a force to said adjustable first magnetic pole which transfers said force to said stamper and said magnetic media while said stamper and magnetic media are exposed to said magnetic field; and
- an elastomer pad for distributing and equalizing the force exerted by the said press.

14. A system for creating magnetic patterns on magnetic media, comprising:
- a stamper with a pattern;
- a magnet having an a first magnetic pole with a moveable pole section and a fixed pole section and a second magnetic pole capable of supplying a magnetic field of at least 2000 Gauss to said stamper and said magnetic media; and
- a press for supplying a force to said moveable pole section of first magnetic pole which transfers said force to said stamper and said magnetic media while said stamper and magnetic media are exposed to said magnetic field.

15. The system of claim 14 wherein said magnet is a electromagnet.

16. The system of claim 14 wherein said press is a pneumatic hydraulic press.

17. A system for creating magnetic patterns on magnetic media, comprising:
- a stamper with a pattern;
- a magnet having an a first magnetic pole with a moveable pole section and a fixed pole section and a second magnetic pole for supplying a magnetic field to said stamper and said magnetic media
- a press for supplying a force to said moveable pole section of first magnetic pole which transfers said force to said stamper and said magnetic media while said stamper and magnetic media are exposed to said magnetic field; and a
- an elastomer pad for cushioning the force exerted by said press.

18. A system for creating magnetic patterns on magnetic media, comprising:
- a stamper with a pattern;
- a magnet having an adjustable first magnetic pole and an adjustable second magnetic pole for supplying a magnetic field to said stamper and said magnetic media;
- a first press for supplying a first force to said adjustable first magnetic pole which transfers said first force to said stamper and said magnetic media while said stamper and magnetic media are exposed to said magnetic field; and
- a second press for supplying a second force to said adjustable second magnetic pole which transfers said second force to said stamper and said magnetic media while said stamper and magnetic media are exposed to said magnetic field.

19. A method for servo formatting a magnetic media comprising the steps of:
- aligning a stamper and said magnetic media;
- applying a force to said stamper and magnetic media so that the said stamper and said magnetic media are in firm contact;
- applying a magnetic field to said stamper and said magnetic media, said magnetic field applied is greater than 2000 Gauss.

20. The method of claim 19 wherein the magnetic field applied is greater than 3000 Gauss.

21. A system for servo writing comprising;
- means for firmly pressing a magnetic media against a stamper; and
- means for applying a magnetic field of at least 2000 Gauss to said magnetic media and said stamper while said magnetic media and said stamper are being pressed.

* * * * *